US006889125B2

(12) United States Patent
Nakao et al.

(10) Patent No.: US 6,889,125 B2
(45) Date of Patent: May 3, 2005

(54) VEHICLE DRIVING APPARATUS

(75) Inventors: Hatsuo Nakao, Toyota (JP); Kenji Itagaki, Toyota (JP); Kouki Moriya, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 177 days.

(21) Appl. No.: 09/986,196

(22) Filed: Nov. 7, 2001

(65) Prior Publication Data

US 2002/0059019 A1 May 16, 2002

(30) Foreign Application Priority Data

Nov. 16, 2000 (JP) ........................................ 2000-350080

(51) Int. Cl.[7] .............................................. B60L 11/03
(52) U.S. Cl. ........................................................ 701/22
(58) Field of Search ................................ 701/22, 67, 68; 297/7, 21, 17, 38 R, 40 R; 318/140, 153; 477/7, 8, 52, 54, 70, 73, 77; 180/65.1

(56) References Cited

U.S. PATENT DOCUMENTS

| 4,533,011 | A | 8/1985 | Heidemeyer et al. | |
|---|---|---|---|---|
| 4,899,857 | A | 2/1990 | Tateno et al. | |
| 5,117,931 | A | 6/1992 | Nishida | |
| 5,635,805 | A | 6/1997 | Ibaraki et al. | 318/139 |
| 5,725,064 | A | 3/1998 | Ibaraki et al. | 180/65.2 |
| 5,735,770 | A | 4/1998 | Omote et al. | |
| 5,801,499 | A | 9/1998 | Tsuzuki et al. | |
| 5,818,116 | A | 10/1998 | Nakae et al. | 290/38 R |
| 5,899,828 | A | 5/1999 | Yamazaki et al. | 477/4 |
| 5,909,094 | A | * | 6/1999 | Yamada et al. | 318/140 |
| 5,942,862 | A | * | 8/1999 | Yamada et al. | 318/9 |
| 6,018,198 | A | * | 1/2000 | Tsuzuki et al. | 290/17 |
| 6,176,807 | B1 | 1/2001 | Oba et al. | 477/5 |

FOREIGN PATENT DOCUMENTS

| DE | 710787 | 9/1941 |
|---|---|---|
| EP | 0 743 210 A2 | 11/1996 |
| EP | 1 036 695 A2 | 9/2000 |
| JP | 08-014145 | 1/1996 |
| JP | 09-324668 | 12/1997 |
| JP | 11-147424 | 6/1999 |
| WO | WO 99/50084 A | 10/1999 |
| WO | WO 00/41909 | 7/2000 |

* cited by examiner

Primary Examiner—Thu V. Nguyen
(74) Attorney, Agent, or Firm—Kenyon & Kenyon

(57) ABSTRACT

A vehicle driving apparatus that operates a motor generator efficiently for improving driving comfort. The apparatus includes a motor generator and a connecting mechanism. The connecting mechanism connects the motor generator to an auxiliary device and selectively connects the motor generator to the engine. When the engine is maintained in an automatically stopped state, the motor generator is disconnected from the engine and drives the auxiliary device. When the engine stopping condition is satisfied, the motor generator rotates an engine drive shaft, thus suppressing vibration otherwise caused by stopping of the engine. When the engine starting condition is satisfied, the motor generator rotates the engine drive shaft to generate force to move the vehicle. In this state, the engine is started. When the vehicle is moving, the motor generator generates power through the engine.

26 Claims, 8 Drawing Sheets

VEHICLE DRIVING APPARATUS

BACKGROUND OF THE INVENTION

The present invention relates to vehicle driving apparatuses, and, more particularly, to vehicle driving apparatuses that selectively connect a motor generator to an engine.

Japanese Unexamined Patent Publication Nos. 11-147424 and 9-324668 describe a vehicle driving apparatus that connects a motor generator to an engine through a power distributing mechanism, or a pulley and a belt. The power distributing mechanism also connects the motor generator to auxiliary devices such as an air-conditioning compressor and a power steering pump. The power distributing mechanism is connected to the engine drive shaft through a clutch.

When the vehicle is traveling in a normal operation mode, the clutch is engaged with the power distributing mechanism such that the motor generator generates power in accordance with the power of the engine. The engine may include an economy running system or an automatic stop system. The system automatically stops the engine when, for example, the vehicle stops at a signal and automatically re-starts the engine when the vehicle is operated to re-start, thus lowering power consumption. When the engine is automatically re-started by this system, the power distributing mechanism is engaged with the clutch such that the motor generator activates the engine.

When the economy running system automatically stops the engine, the clutch is released such that the motor generator drives the auxiliary devices without rotating the engine drive shaft. That is, the motor generator is selectively connected to the engine, thus improving the efficiency of the motor generator.

However, the operation efficiency of the motor generator can still be improved. In other words, the motor generator can be operated more efficiently to improve the vehicle's performance.

BRIEF SUMMARY OF THE INVENTION

Accordingly, it is an objective of the present invention to provide a vehicle driving apparatus that operates a motor generator further efficiently to improve driving comfort.

To achieve the foregoing and other objectives and in accordance with the purpose of the present invention, the invention provides a vehicle driving apparatus installed in a vehicle that has an engine driven by a drive shaft. The apparatus automatically stops the engine if a predetermined condition for stopping the engine is satisfied and automatically starts the engine if a predetermined condition for starting the engine is satisfied. The vehicle includes an auxiliary device that is connected to the engine. The apparatus further includes a motor generator, a connecting mechanism, an auxiliary device driving means, a vibration suppressing means, a vehicle starting means, an engine starting means, and a traveling-mode power generating means. The motor generator is selectively connected to the engine. The connecting mechanism connects the motor generator to the auxiliary device, and the connecting mechanism selectively connects the motor generator to the engine. The auxiliary device driving means enables the connecting mechanism to disconnect the motor generator from the engine and drives the auxiliary device through the motor generator in response to a request to drive the auxiliary device when the engine is maintained in an automatically stopped state. The vibration suppressing means controls rotation of the drive shaft of the engine in the stopped state through the motor generator for suppressing vibration caused by stopping of the engine when the engine stopping condition is satisfied. The vehicle starting means controls the rotation of the drive shaft of the engine through the motor generator for generating force to move the vehicle when the engine starting condition is satisfied. The engine starting means starts the engine through the rotation of the drive shaft of the engine controlled by the vehicle starting means when the engine starting condition is satisfied. The traveling-mode power generating means enables the motor generator to generate power through the rotation of the drive shaft of the engine when the vehicle is traveling.

A further perspective of the present invention is a method for controlling a vehicle driving apparatus that includes a motor generator, an auxiliary device, and a connecting mechanism. The connecting mechanism connects the motor generator to the auxiliary device and selectively connects the motor generator to an engine. The method includes the following steps. The steps include automatically stopping the engine when a predetermined condition for stopping the engine is satisfied, automatically starting the engine when a predetermined condition for starting the engine is satisfied, enabling the connecting mechanism to disconnect the motor generator from the engine and driving the auxiliary device through the motor generator in response to a request to drive the auxiliary device when the engine is maintained in an automatically stopped state, suppressing vibration caused by stopping of the engine by enabling the connecting mechanism to connect the motor generator to the engine and controlling shaft rotation of the engine in the stopped state through the motor generator when the engine stopping condition is satisfied, enabling the connecting mechanism to connect the motor generator to the engine and controlling the shaft rotation of the engine through the motor generator for generating force to move a vehicle when the engine starting condition is satisfied, starting the engine through the shaft rotation of the engine when the engine starting condition is satisfied, and enabling the connecting mechanism to connect the motor generator to the engine and enabling the motor generator to generate power through the engine when the vehicle is traveling.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
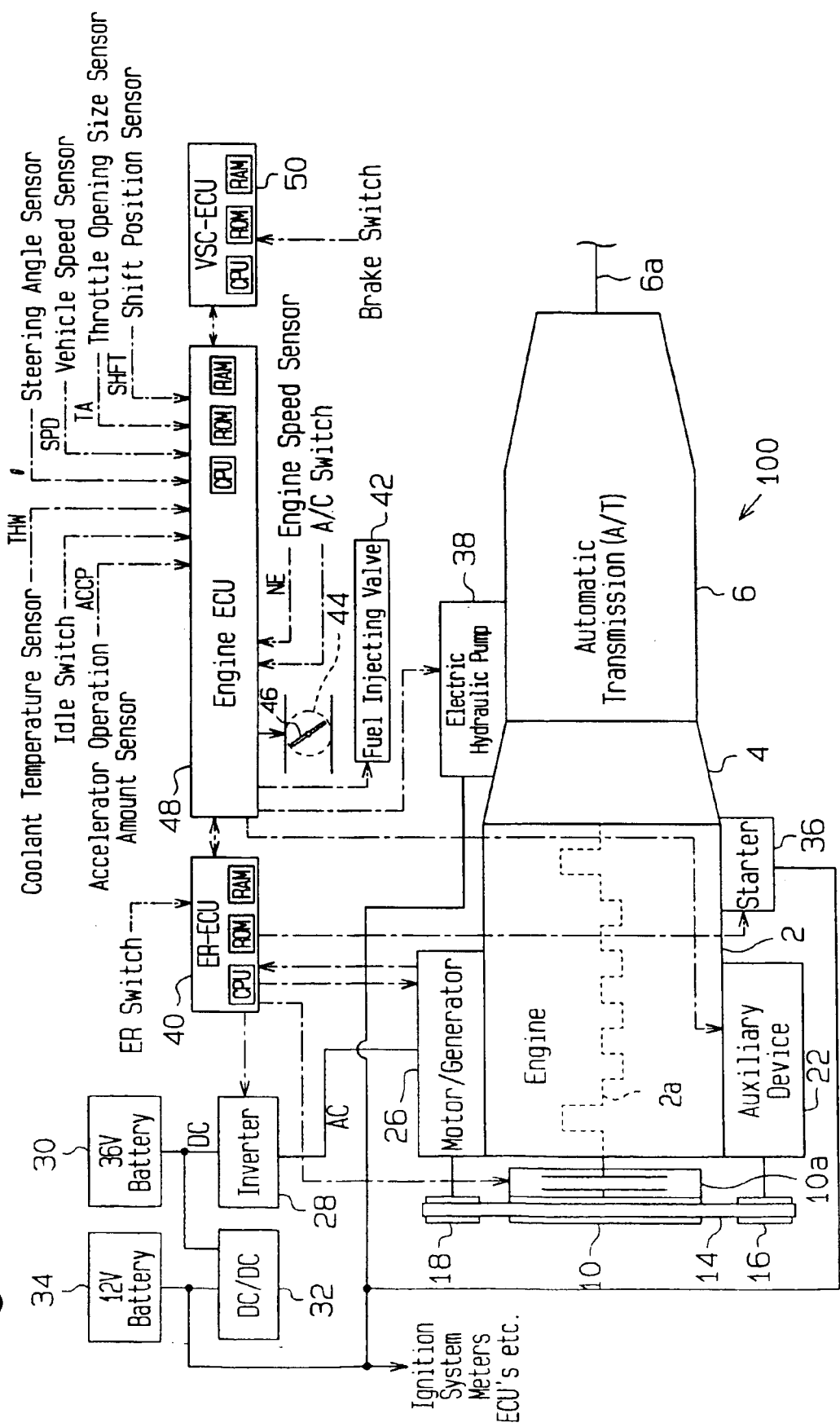
FIG. 1 is a diagrammatic view showing a vehicle driving apparatus of an embodiment according to the present invention.

In the drawings, like numerals are used for like components throughout.

FIG. 1 is a block diagram showing a vehicle driving apparatus 100 of one embodiment of the present invention. A vehicle engine 2 and a control device for the apparatus 100 are also shown. The engine 2 is a gasoline engine.

The power of the engine 2 is transmitted from a crankshaft (a drive shaft) 2a of the engine 2 to an output shaft 6a through a torque converter 4 and an automatic transmission (hereinafter referred to as an "A/T") 6. The power is then transmitted to the wheels of the vehicle. This structure forms a drive force transmitting system from the engine 2 to the wheels. Further, the power of the engine is transmitted to a belt 14 through a pulley 10 that is connected to the crankshaft 2a. The pulley 10 rotates pulleys 16, 18. The pulley 10 is connected to an electromagnetic clutch 10a that selectively transmits the engine power from the crankshaft 2a to the pulley 10.

The pulley 16 is connected to a rotary shaft of an auxiliary device 22, and the auxiliary device 22 is driven by the power from the belt 14. Although only one is shown in FIG. 1, this embodiment may include a plurality of auxiliary devices such as an air-conditioning compressor, a power steering pump, and an engine cooling water pump. Each device has a pulley that rotates with the belt 14.

A motor generator (hereinafter referred to as an "M/G") 26 is connected to the belt 14 through the pulley 18. The M/G 26 selectively functions as a power generator (in a power generating mode). That is, the M/G 26 converts the engine power, which is transmitted from the engine 2 to the M/G 26 through the belt 18, to electric energy. Further, the M/G 26 selectively functions as a motor (in a driving mode) to drive at least the engine 2 or the auxiliary device 22 through the pulley 18 and the belt 14.

The M/G 26 is connected to an inverter 28. When the M/G 26 operates in the power generating mode, the inverter 28 receives an alternate current from the M/G 26 and converts the current to a direct current. The inverter 28 supplies the direct current to a battery 30 for a high-voltage (in this embodiment, 36V) power source, thus charging the battery 30. The inverter 28 also supplies the direct current to a battery 34 for a low-voltage (in this embodiment, 12V) power source through a DC/DC converter 32, thus charging the battery 34. The inverter 28 further supplies the direct current to, for example, an ignition system, various meters, and various ECU's, through the DC/DC converter 32.

If the M/G operates in the driving mode, the inverter 28 supplies power from the high-voltage power source battery 30 to the M/G 26. The M/G 26 thus drives the auxiliary device 22 through the pulley 18 and the belt 14 if the engine 2 is stopped (an engine-stopped mode). In contrast, the M/G 26 rotates the crank shaft 2a of the engine 2 when the engine 2 is automatically started (in an automatic engine starting mode) or the engine 2 is automatically stopped (in an automatic engine stopping mode) or the vehicle is started (in a vehicle starting mode). The inverter 28 adjusts the power supply from the high-voltage power source battery 30 to control the speed of the M/G 26.

A starter 36 is used for cold starting of the engine 2. More specifically, the starter 36 is supplied with power from the low-voltage power source battery 34 to rotate a ring gear (not shown), thus starting the engine 2.

The A/T 6 includes an electric hydraulic pump 38 that is supplied with power from the low-voltage power source battery 34. The hydraulic pump 38 supplies hydraulic fluid to a hydraulic pressure control unit (not shown) of the A/T 6. The control unit incorporates a control valve that controls the supply of the hydraulic fluid to adjust the operation of a clutch of the A/C 6, a brake, and a one-way clutch. The stage of the A/C 6 is thus selectively shifted.

An economy running electric control unit (hereinafter referred to as an "ER-ECU") 40 controls the operation of the electromagnetic clutch 10a and various operation modes of the M/G 26. The ER-ECU (control circuit) 40 also controls the inverter 28 and the starter 36 and the charge level of each battery 30, 34. The M/G 26 incorporates a rotational speed sensor that transmits the speed at which the rotary shaft of the M/G 26 rotates to the ER-ECU 40. The ER-ECU 40 judges whether or not an economy running system (an ER system) is activated based on the operation state of an economy running switch (ER switch). The ER-ECU 40 also gathers various other data.

An engine ECU 48 controls the operation of the hydraulic pump 38, the shifting of the A/T 6, the operation of a fuel injecting valve 42 (an intake port injecting type or an in-cylinder injecting type), the opening size of a throttle valve 46, which is opened by an electric motor 44, the operation of the auxiliary devices except for a water pump, and other operations of the engine 2.

The engine ECU 48 acquires various data such as the engine coolant temperature THW from a coolant temperature sensor, the operation state of an accelerator pedal from an idle switch, the accelerator depression amount ACCP from an accelerator operation amount sensor, the steering angle θ from a steering sensor, the vehicle speed SPD from a vehicle speed sensor, the throttle opening size TA from a throttle opening sensor, the shift position SHFT from a shift position sensor, the engine speed NE from an engine speed sensor, and the operation state of the ER system from the ER switch. The engine ECU 48 controls the engine 2 in accordance with the data.

A vehicle stability control ECU (VSC-ECU) 50 automatically controls the brakes of the wheels. For this purpose, the VSC-ECU 50 acquires data such as the depression state of a brake pedal from a brake switch.

Each ECU 40, 48, 50 includes a microcomputer (central processing unit (CPU)), a read only memory (ROM), and a random access memory (RAM). Each microcomputer executes a predetermined computing procedure in accordance with a program stored in its ROM, thus performing various control procedures based on the result of the computation.

The ECU's 40, 48, 50 communicate with one another to exchange their computation results and acquired data. The ECU's 40, 48, 50 thus exchange data as necessary for performing coordinated control procedures.

The ER-ECU 40 performs the following vehicle operating control procedures. An automatic engine stopping procedure and an automatic engine starting procedure are executed when the ER switch is turned on.

Figure 2:
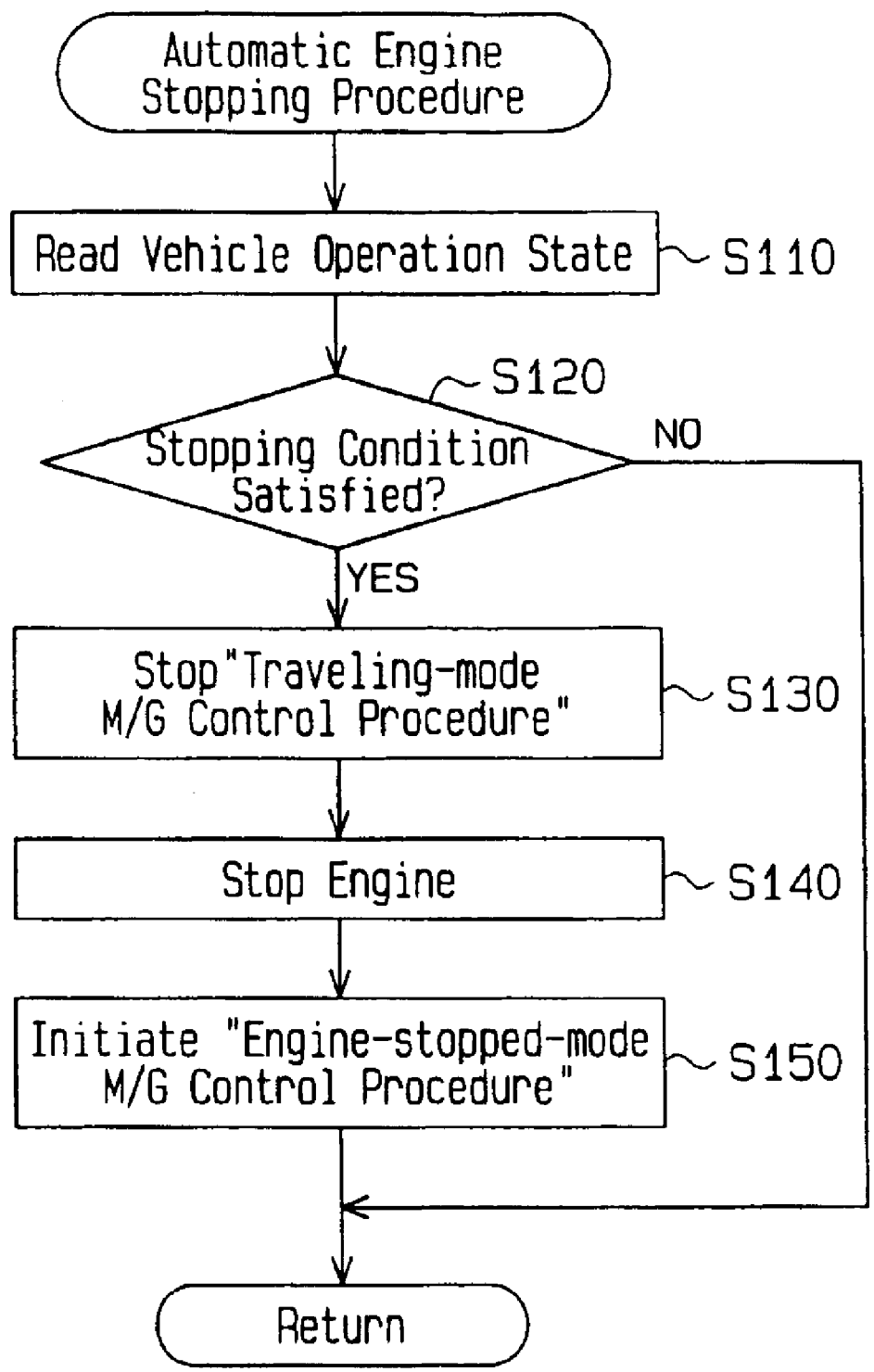
FIG. 2 is a flowchart showing an automatic engine stopping procedure performed by an ER-ECU of the apparatus of FIG. 1.

FIG. 2 is a flowchart showing the automatic engine stopping procedure. The ER-ECU 40 repeatedly executes the automatic engine stopping procedure in relatively short cycles.

To perform the automatic engine stopping procedure, the ER-ECU 40 first detects the operation state of the vehicle to judge whether or not the procedure is needed (step S110). More specifically, in S110, the ER-ECU 40 receives data such as the coolant temperature THW from the coolant temperature sensor, the operation state of the accelerator pedal from the idle switch, the voltage of each battery 30, 34, the depression state of the brake pedal from the brake switch, and the vehicle speed SPD from the vehicle speed sensor. The ER-ECU 40 then stores the data in a memory (RAM).

Subsequently, the ER-ECU 40 judges whether or not a condition for initiating the automatic engine stopping procedure is met based on the data stored in the RAM (step S120). More specifically, the judgment is based on, for example, the following five items.

(1) The engine 2 is already warmed up but is not excessively heated (the engine coolant temperature THW is lower than a maximum level but is higher than a minimum level).

(2) The accelerator pedal is not depressed (the idle switch is turned on).

(3) The charge level of each battery 30, 34 reaches a predetermined level.

(4) The brake pedal is depressed (the brake switch is turned on).

(5) The vehicle is stopped (the vehicle speed SPD is 0 km/h)

If all these items (1)–(5) are satisfied, the ER-ECU 40 determines that the condition for initiating the automatic engine stopping procedure is met.

Otherwise, or if one of these items is unsatisfied, the ER-ECU 40 determines that the initiating condition is not satisfied, thus discontinuing the procedure.

Figure 6:
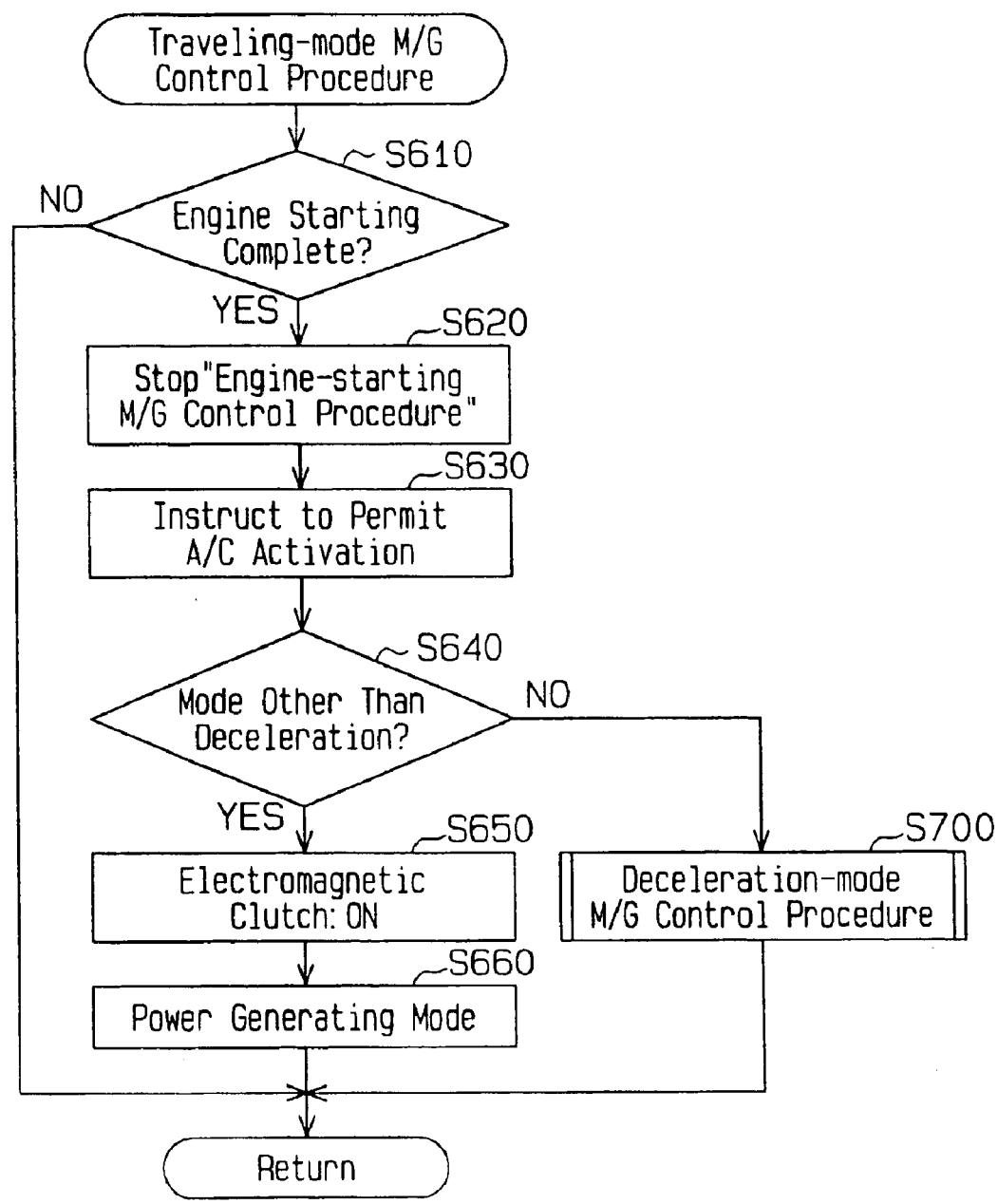
FIG. 6 is a flowchart showing a traveling-mode M/G control procedure performed by the ER-ECU.

Thus, if the vehicle is stopped, for example, at a signal and all items (1)–(5) are satisfied, the ER-ECU 40 stops a traveling mode M/G control procedure of FIG. 6 (step S130).

The ER-ECU 40 then stops the engine 2 (step S140). More particularly, the ER-ECU 40 instructs the engine ECU 48 to cut the fuel supply to the engine. In response to the instruction, the engine ECU 48 stops fuel injection through the fuel injecting valve 42 and fully closes the throttle valve 46. This interrupts combustion in each combustion chamber, thus stopping the engine 2. In this state (engine stopped state), the crankshaft 2a of the engine 2 is still rotating.

Next, the ER-ECU 40 initiates an engine-stopped-mode M/G control procedure (FIG. 3) and suspends the automatic engine stopping procedure (in step S150).

Figure 3:
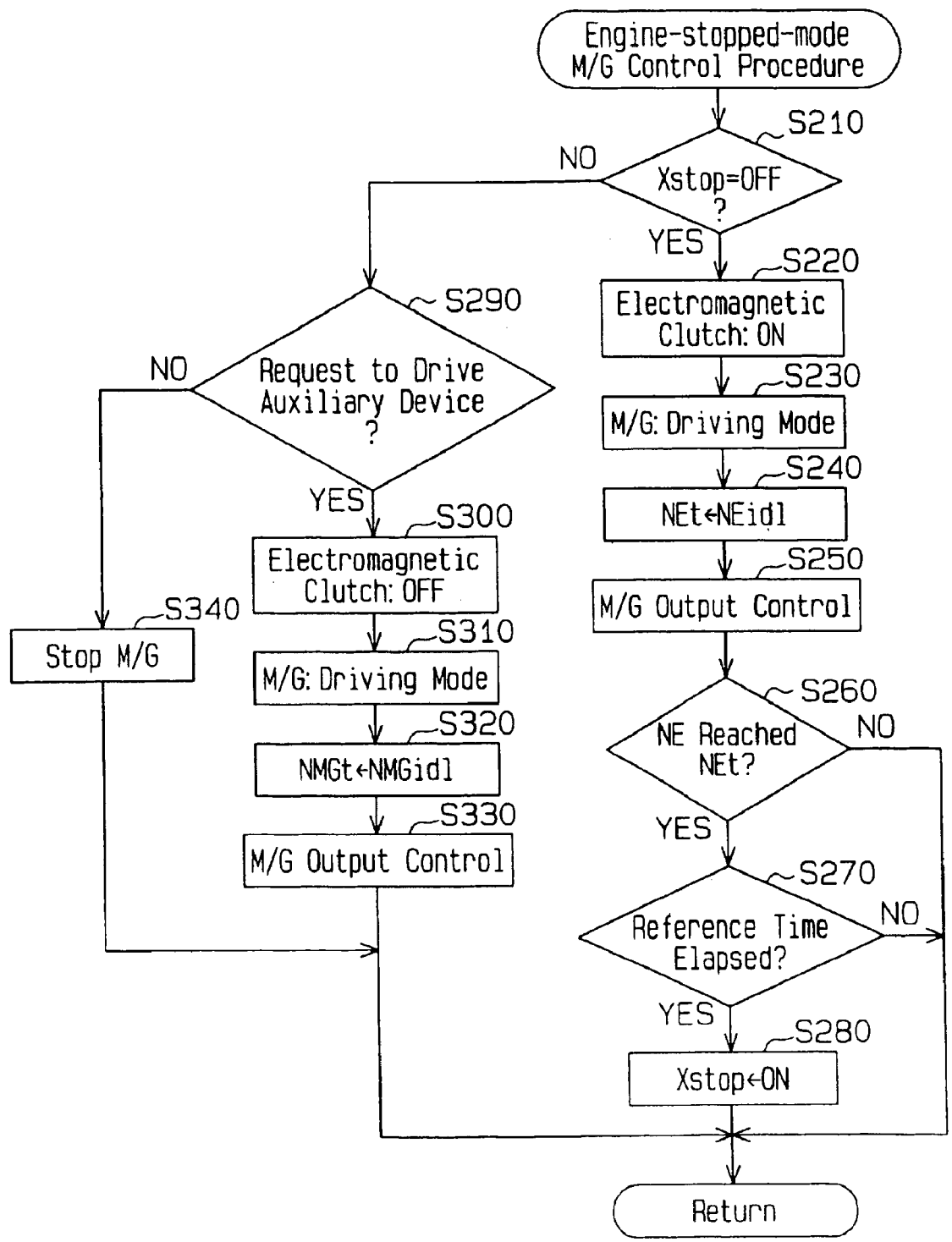
FIG. 3 is a flowchart showing an engine-stopped-mode M/G control procedure performed by the ER-ECU.

FIG. 3 is a flowchart showing the engine-stopped-mode M/G control procedure. This procedure is initiated in accordance with S150 of the automatic engine stopping procedure and is repeatedly performed in relatively short cycles.

In the engine-stopped-mode M/G control procedure, the ER-ECU 40 first judges whether a flag Xstop is ON or OFF (step S210). The flag Xstop indicates whether or not an engine-stopped-mode vibration suppressing procedure is being performed. The flag Xstop switches to OFF when the ER-ECU 40 is activated and when a condition for initiating the automatic engine starting procedure (FIG. 4) is met in the automatic engine starting procedure.

Thus, the flag Xstop is initially OFF. Accordingly, the ER-ECU 40 proceeds to step S220 and activates (turns on) the electromagnetic clutch 10a of the pulley 10. If the electromagnetic clutch 10a has already been activated, the ER-ECU 40 maintains the electromagnetic clutch 10a as activated in this step. The ER-ECU 40 maintains the electromagnetic clutch 10a as activated in other similar steps if the electromagnetic clutch 10a has already been activated. Subsequently, in step S230, the ER-ECU 40 switches the M/G 26 to a driving mode.

The ER-ECU 40 then selects a target idle speed NEid1 (for example, 600 rpm) as a target engine speed NEt of the engine 2 (step S240).

Next, the ER-ECU 40 instructs the inverter 28 to control the output power of the M/G 26. In response to the instruction, the inverter 28 drives the M/G 26 such that the engine speed NE becomes the target engine speed NEt (step S250). In this state, the crank shaft 2a of the engine 2 is rotated integrally with the M/G 26 through the pulley 18, the belt 14, and the pulley 10.

The ER-ECU 40 then judges whether or not the engine speed NE has reached the target engine speed NEt (step S260). If the judgment is negative, the ER-ECU 40 discontinues the engine-stopped-mode M/G control procedure.

Afterwards, the ER-ECU 40 repeatedly performs the steps S220 to S250 until the engine speed NE reaches the target engine speed NEt. Afterwards, the ER-ECU 40 judges whether or not a reference time has elapsed since the engine speed NE reached the target value NEt (step S270). The reference time is, for example, 0.5 to three seconds. The ER-ECU 40 repeatedly performs the steps S220 to S260 until the judgment of S270 becomes positive.

If the judgment of S270 becomes positive, or the reference time has elapsed, the ER-ECU 40 sets the flag Xstop to ON (step S280). The ER-ECU 40 then discontinues the engine-stopped-mode M/G control procedure.

As described, when the operation of the engine 2 is maintained as stopped, or during the engine stopped mode, the M/G 26 rotates the crankshaft 2a of the engine 2 at a speed equal to an idle speed. Thus, with the throttle valve 46 fully closed, the pressure in each cylinder of the engine 2 is sufficiently lowered. In this state, the differences in load torque applied by the combustion chambers are relatively small. This reduces the torque variation caused by the rotation of the crankshaft 2a. Accordingly, vibration is reduced during the engine stopped mode, which improves driving comfort.

Subsequently, in step S280, the ER-ECU 40 sets the flag Xstop to ON. Accordingly, when resuming the engine-stopped-mode M/G control procedure, the ER-ECU 40 judges negative in step S210, or the flag Xstop is ON, in step S210 and proceeds to step S290.

In S290, the ER-ECU 40 judges whether or not there is a request for driving any auxiliary device. If the judgment is positive, the ER-ECU 40 de-activates (turns off) the electromagnetic clutch 10a (step S300) and switches the M/G 26 to the driving mode (step S310). If the electromagnetic clutch 10a has already been de-activated before S300, the ER-ECU 40 maintains the electromagnetic clutch 10a as de-activated in S300. The ER-ECU 40 maintains the deactivation of the electromagnetic clutch 10a in other similar steps if the electromagnetic clutch 10a has already been de-activated.

Subsequently, in step S320, the ER-ECU 40 selects a rotational speed NMGid1 as a target rotational speed NMGt of the M/G 26. The value NMGid1 is obtained by converting the target idle speed NEid1 to a rotational speed of the M/G 26. In step S330, the ER-ECU 40 controls the M/G 26 through the inverter 28 such that the actual rotational speed NMG of the M/G 26 reaches the target rotational speed NMGt. The ER-ECU 40 then suspends the engine-stopped-mode M/G control procedure.

If the judgment of S290 is negative, or there is no request for driving an auxiliary device, the ER-ECU 40 stops the M/G 26 in step S340, thus suspending the engine-stopped-mode M/G control procedure.

Accordingly, if there is a request for driving the auxiliary device 22, the M/G 26 drives the auxiliary device 22 such that the auxiliary device 22 operates in the same manner as it does when the engine 2 idles. In other words, even during the engine stopped mode, the air conditioner or the power steering device is operated as needed.

Further, in this procedure, the deactivation of the electromagnetic clutch 10a is maintained when the M/G 26 drives the auxiliary device 22. That is, the crankshaft 2a of the engine 2 does not rotate in this state. This reduces power consumption, which decreases fuel consumption.

Figure 4:
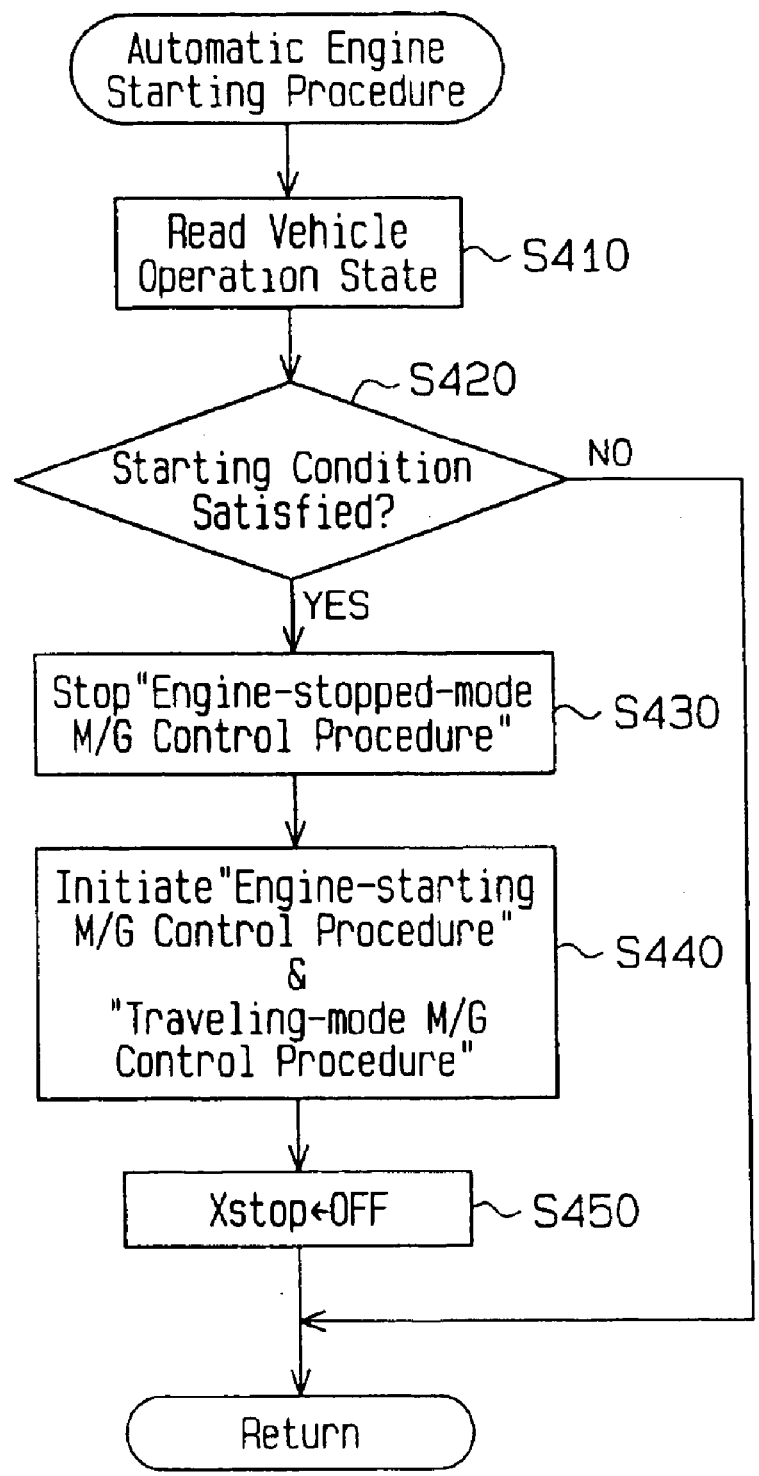
FIG. 4 is a flowchart showing an automatic engine starting procedure performed by the ER-ECU.

FIG. 4 is a flowchart showing the automatic engine starting procedure. The ER-ECU 40 repeatedly performs the automatic engine starting procedure in relatively short cycles.

To perform the automatic engine starting procedure, the ER-ECU 40 acquires data pertaining to the operational state of the vehicle such as the engine coolant temperature THW, the operational state of the idle switch, the charge level of each battery 30, 34, the operational state of the brake switch, and the vehicle speed SPD. The EC-ERU 40 stores the data in its RAM (step S410). Based on the data, the EC-ERU 40 judges whether or not it should execute the automatic engine starting procedure.

More specifically, the ER-ECU 40 judges whether or not a condition for initiating the automatic engine starting procedure is met based on the data stored in its RAM (step S420). The ER-ECU 40 determines that the condition for initiating the automatic engine starting procedure is met if the engine 2 has been stopped in accordance with the automatic engine stopping procedure and at least one of the following five items is unsatisfied.

(1) The engine 2 is already warmed up but is not excessively heated (the engine coolant temperature THW is lower than the maximum level but is higher than the minimum level).

(2) The accelerator pedal is not depressed (the idle switch is turned on).

(3) The charge level of each battery 30, 34 reaches a predetermined level.

(4) The brake pedal is depressed (the brake switch is turned on).

(5) The vehicle is stopped (the vehicle speed SPD is 0 km/h)

If the engine 2 has been stopped for a purpose other than the automatic engine stopping procedure, the judgment of S420 is negative. That is, the ER-ECU 40 determines that the condition for initiating the automatic engine starting procedure is not met. Also, the judgment is negative if all items (1)–(5) are satisfied, regardless of whether or not the engine 2 has been stopped for the purpose of the automatic engine stopping procedure. In these cases, the ER-ECU 40 suspends the automatic engine starting procedure.

In contrast, if the engine 2 has been stopped in accordance with the automatic engine stopping procedure and the ER-ECU 40 determines that the condition for initiating the automatic engine starting procedure is met, the ER-ECU 40 discontinues the engine-stopped-mode M/G control procedure of FIG. 3 (step S430). Subsequently, in step S440, the ER-ECU 40 initiates an engine-starting M/G control procedure (FIG. 5) and a traveling-mode M/G control procedure (FIG. 6). The ER-ECU 40 then sets the flag Xstop to OFF (step S450) and suspends the automatic engine starting procedure.

Figure 5:
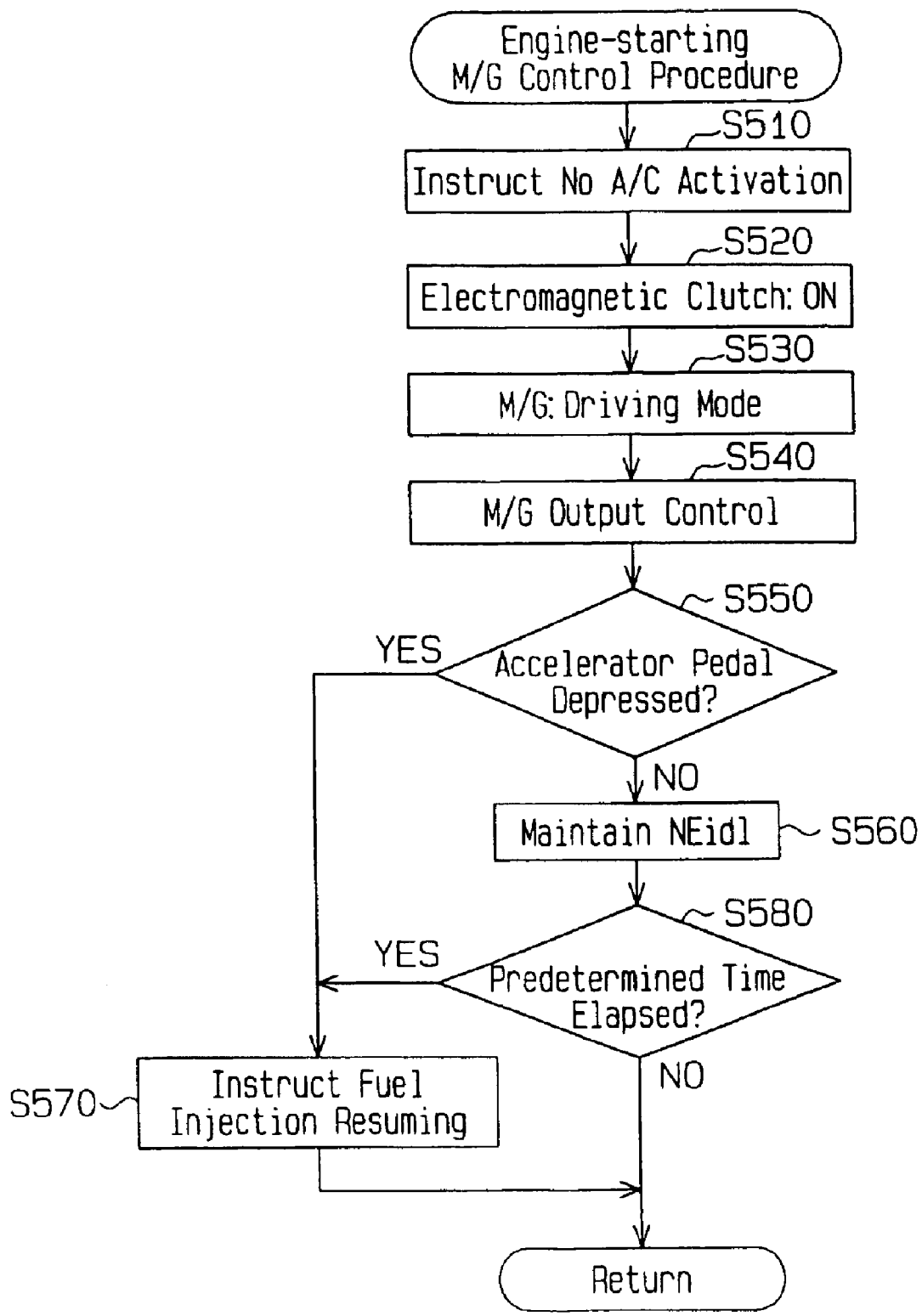
FIG. 5 is a flowchart showing an engine-starting M/G control procedure performed by the ER-ECU.

FIG. 5 is a flowchart showing the engine-starting M/G control procedure. The engine-starting M/G control procedure is initiated in step S440 of the automatic engine starting procedure and is repeatedly performed in relatively short cycles.

In the engine-starting M/G control procedure, the ER-ECU 40 first instructs the engine ECU 48 to stop the operation of the air conditioner (step S510) if the air conditioner is operating. In response to the instruction, the engine ECU 48 stops the operation of the air conditioner. This reduces the load that acts on the M/G 26 during the engine starting mode.

The ER-ECU 40 then activates the electromagnetic clutch 10a (step S520) and switches the M/G 26 to the driving mode (step S530). Subsequently, in step S540, the ER-ECU 40 controls the output power of the M/G 26. More specifically, the ER-ECU 40 controls the M/G 26 to rotate the crankshaft 2a of the engine 2 such that the engine speed rapidly increases to the target idle speed NEid1, for example, 600 rpm.

Next, in step S550, the ER-ECU 40 judges whether or not the accelerator pedal has been depressed after the initiation of the M/G staring procedure. If the judgment is negative, the ER-ECU 40 controls the M/G 26 to maintain the engine speed NE at the target idle speed NEid1 in step S560.

Afterwards, in step S580, the ER-ECU 40 judges whether or not the engine speed NE has been maintained at the target idle speed NEid1 for a predetermined time. If the judgment is negative, the ER-ECU 40 suspends the engine-starting M/G control procedure.

However, if the judgment of S580 is positive, the ER-ECU 40 instructs the engine ECU 48 to resume fuel injection (step S570). In response to the instruction, the engine ECU 48 enables the fuel injecting valve 42 to inject fuel. The engine 2 is thus started.

More specifically, fuel injection is resumed when the crankshaft 2a of the engine 2 rotates at the target idle speed NEid1. The engine 2 is thus smoothly started and the operation of the engine 2 is rapidly stabilized. Further, since the M/G 26 maintains the crankshaft 2a in a rotating state until the fuel injection is resumed, the torque converter 4, which is maintained in a non-lockup state, generates creep power, thus permitting the vehicle to proceed. In addition, fuel injection is resumed in the engine 2 while the M/G 26 is operating to move the vehicle. This improves driving comfort.

If the judgment of S550 is positive, that is, if the accelerator pedal is depressed before the engine speed NE reaches the target idle speed NEid1, the ER-ECU 40 immediately instructs the engine ECU 48 to start fuel injection (step S570). Accordingly, the engine 2 is rapidly started when needed.

FIG. 6 is a flowchart showing the traveling-mode M/G control procedure. The procedure is initiated in step S440 of the automatic engine starting procedure and is repeatedly performed in relatively short cycles.

In the traveling-mode M/G control procedure, the ER-ECU 40 first judges whether or not the engine 2 has been started in accordance with the engine-starting M/G control procedure (FIG. 5) (step S610). If the judgment is negative, that is, if the engine 2 has not started, the ER-ECU 40 suspends the traveling-mode M/G control procedure. In contrast, if the judgment is positive because the engine 2 has been started, the ER-ECU 40 discontinues the engine-starting M/G control procedure (step S620).

Subsequently, the ER-ECU 40 instructs the engine ECU 48 to permit the air conditioner to be activated (step S630).

That is, if it is required that the air conditioner is activated, the engine ECU 48 operates the air conditioning compressor in accordance with rotation of the pulley 16, thus driving the air conditioner.

The ER-ECU 40 then judges whether or not the vehicle is in a state other than a deceleration mode (step S640). More specifically, the ER-ECU 40 determines that the vehicle is in the deceleration mode if, for example, the accelerator pedal is released such that the idle switch is turned on.

If the judgment of S640 is positive, or the vehicle is in a state other than the deceleration mode (the idle switch is turned off), the ER-ECU 40 actuates the electromagnetic clutch 10a in step S650. The ER-ECU 40 then switches the M/G 26 to the power generating mode (step S660) and suspends the traveling-mode M/G control procedure. Accordingly, as long as the vehicle is in a normal traveling mode, the M/G 26 generates power, thus charging the batteries 30, 34 and supplying the electric systems with the power.

In contrast, if the judgment of step S640 is negative, or the vehicle is in the deceleration mode, the ER-ECU 40 executes a deceleration-mode M/G control procedure (step S700).

Figure 7:
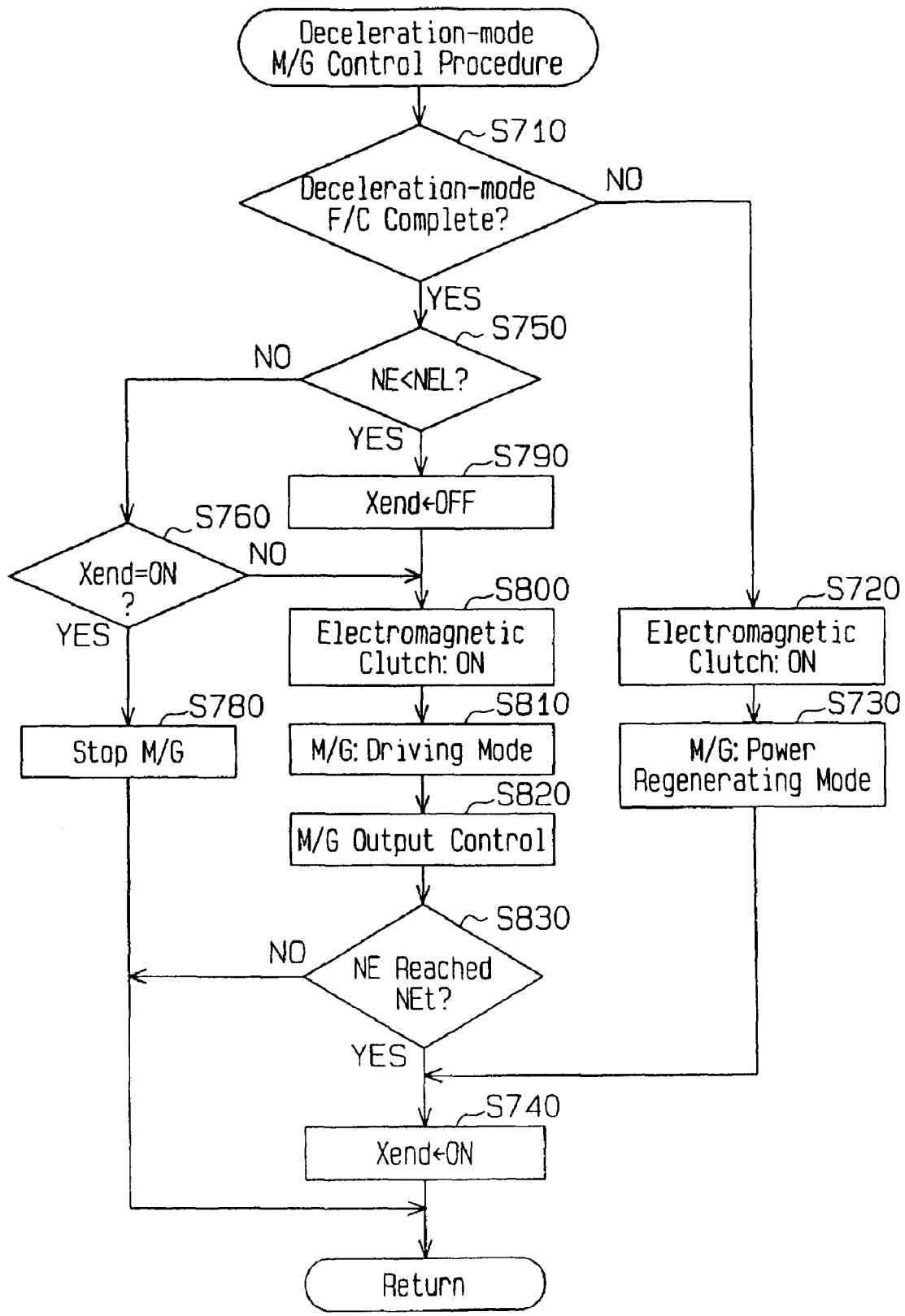
FIG. 7 is a flowchart showing a deceleration-mode M/G control procedure performed by the ER-ECU.

FIG. 7 is a flowchart showing the deceleration-mode M/G control procedure.

In the deceleration-mode M/G control procedure, the ER-ECU 40 first judges whether or not a deceleration-mode fuel cutting (F/C) procedure has been completed (step S710).

More specifically, if the vehicle is in the deceleration mode, the engine ECU 48 performs the deceleration-mode F/C procedure. That is, the engine ECU 48 suspends the fuel injection until the engine speed NE decreases to a reference value for resuming the fuel injection (in this embodiment, the target idle speed NEid1). When the engine speed NE reaches the target idle speed NEid1, the engine ECU 48 shifts the torque converter 48 from a lockup state to a non-lockup state and resumes the fuel injection. This prevents an engine stall from being caused by a drop in the engine speed NE.

If the judgment of S710 is negative, or the ER-ECU 40 determines that the deceleration-mode F/C procedure is being performed, the ER-ECU 40 activates the electromagnetic clutch 10a(step S720). Further, the ER-ECU 40 switches the M/G 26 to a high-voltage power generating mode, or a power regenerating mode (step S730). In the power regenerating mode, the M/G 26 generates power at a voltage higher than it does in the power generating mode. More specifically, although the operation of the engine 2 is stopped during the deceleration-mode F/C procedure, the crankshaft 2a is maintained in a rotating state due to movement of the wheels. The rotation of the crankshaft 2a is transmitted to the M/G 26 through the pulley 10, the belt 14, and the pulley 18. In this state, the M/G 26 generates power while recovering the energy generated by the movement of the vehicle as power.

The ER-ECU 40 then sets a flag Xend to ON (step S740). The flag Xend indicates whether or not a procedure for increasing the engine speed NE should be stopped. The ER-ECU 40 suspends the deceleration-mode M/G control procedure after S740.

If the engine speed NE drops to the fuel-injection-resuming reference value during the deceleration-mode F/C procedure after the M/G 26 recovers the energy generated by the movement of the vehicle in the regenerating mode, the engine ECU 48 stops the F/C procedure. The ER-ECU 40 thus determines that the F/C procedure is complete in step S710 and resumes the fuel injection.

Subsequently, in step S750, the ER-ECU 40 judges whether or not the engine speed NE is higher than an engine-stall reference value NEL. The engine-stall reference value NEL is smaller than the fuel-injection-resuming reference value. That is, if the engine speed NE is lower than the engine-stall reference value NEL regardless of the resumption of fuel injection, the ER-ECU 40 determines that an engine stall is likely to occur.

If the engine speed NE is equal to or higher than the engine-stall reference value NEL, the ER-ECU 40 determines that the engine operation is stable and that an engine stall is unlikely to occur. The ER-ECU 40 then proceeds to step S760 and judges whether or not the flag Xend is ON. In this case, the flag Xend has already been switched to ON in step S740 such that the judgment of step S760 becomes positive. The ER-ECU 40 thus proceeds to step S780 to stop the M/G 26 and suspends the deceleration mode M/G control procedure.

In contrast, if the judgment of S750 is positive, or the engine speed NE is lower than the engine-stall reference value NEL, the ER-ECU 40 determines that the engine 2 has failed to re-start normally and that an engine stall is likely to occur. The ER-ECU 40 then proceeds to step S790 and sets the flag Xend to OFF.

Subsequently, the ER-ECU 40 activates the electromagnetic clutch 10a (step S800) and switches the M/G 26 to the driving mode (step S810). Further, in step S820, the ER-ECU 40 controls the output power generated by the M/G 26. More specifically, the ER-ECU 40 controls the M/G 26 to raise the engine speed NE to the target idle speed NEid1.

The ER-ECU 40 then judges whether or not the engine speed NE has reached the target idle speed NEid1 in step S830. If the judgment is negative, the ER-ECU 40 suspends the deceleration M/G control procedure.

Afterwards, as long as the ER-ECU 40 determines that the engine speed NE is lower than the engine-stall reference value NEL, the ER-ECU 40 repeatedly performs the steps S790 to S830. Even if the judgment of S750 becomes positive, that is, if the ER-ECU 40 determines that the engine speed NE is equal to or higher than the engine-stall reference value NEL, the flag Xend remains OFF as long as the engine speed NE is lower than the target idle speed NEid1. The judgment of step S760 thus remains negative, and the ER-ECU 40 repeats steps S800 to S830.

If the engine speed NE reaches the target idle speed NEid1 in accordance with the controlling of the output power of the M/G 26, the ER-ECU 40 determines that the engine operation is stable or will be stable. The ER-ECU 40 thus sets the flag Xend to ON in step S740.

Accordingly, in the subsequent cycle of the deceleration-mode M/G control procedure, the ER-ECU 40 judges that the flag Xend is ON in step S760 and stops the M/G 26 in step S780.

As described, in this embodiment, if the engine 2 cannot operate stably after completing the deceleration-mode F/C procedure, the M/G 26 increases the engine speed NE, thus preventing the engine stall from occurring. In contrast, if the engine speed NE reaches a sufficient level after completion of the deceleration-mode F/C procedure, the M/G 26 dose not increase the engine speed NE.

If the ignition switch is turned on by the driver to perform cold starting of the engine 2 with the starter 36, the ER-ECU 40 executes the steps S640 to S660 and S700 of the traveling-mode M/G control procedure (FIG. 6). If these steps are followed by step S130 of the automatic engine stopping procedure (FIG. 2), the steps S640 to S660 and S770 are suspended.

Figure 8:
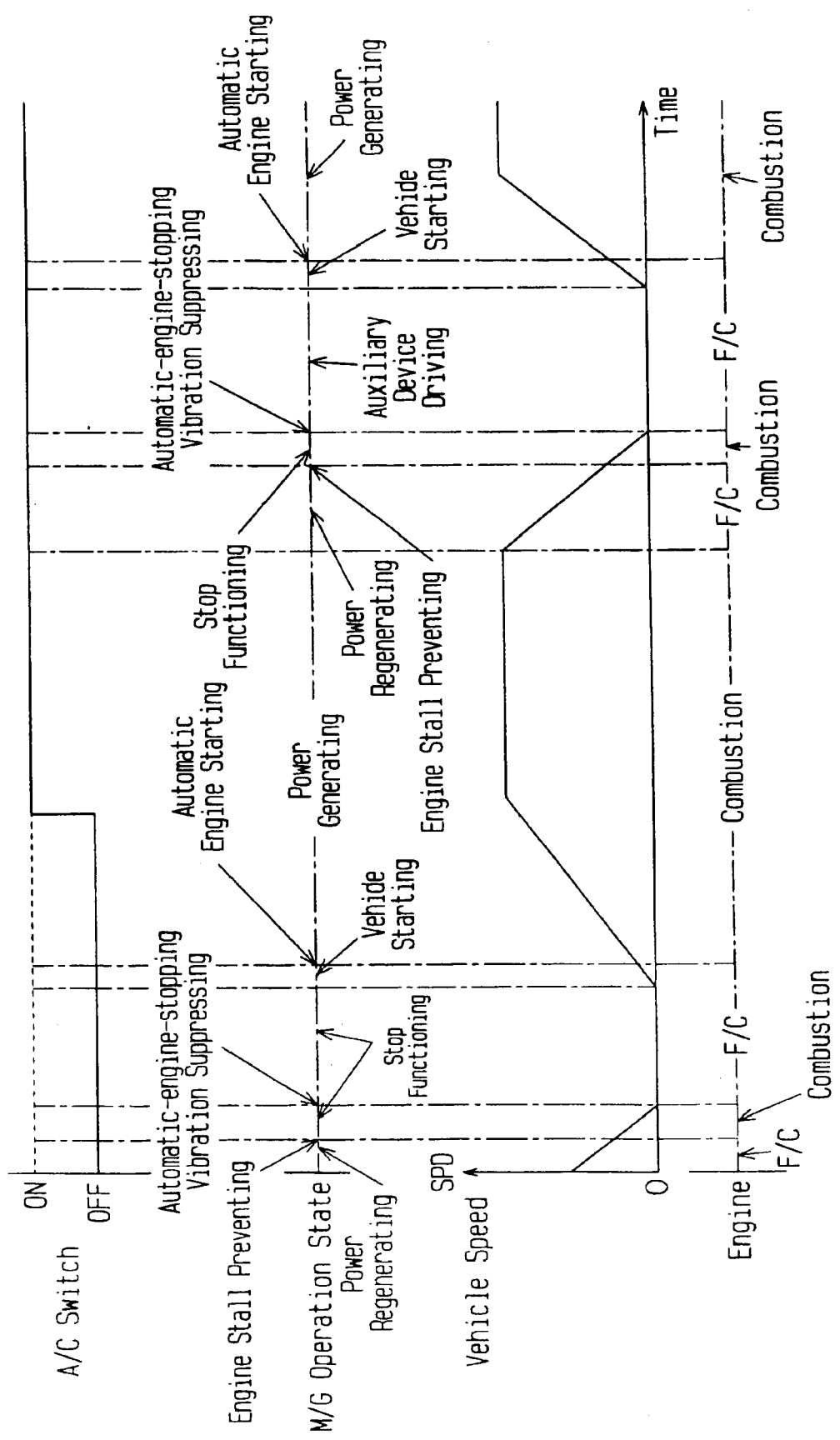
FIG. 8 is a timing chart corresponding to the M/G operation of the apparatus of FIG. 1.

FIG. 8 is a timing chart corresponding to the operation of the M/G 26. As shown in the chart, even if the automatic engine starting procedure and the automatic engine stopping procedure are repeated frequently, the M/G 26 operates efficiently in a constant manner. The operation of the M/G 26 includes the traveling-mode power generation, deceleration-mode power regeneration, the deceleration-mode engine stall prevention, the automatic-engine-stopping-mode vibration reduction, and the engine-stopped-mode auxiliary device operation (and stopping of the M/G 26).

In this embodiment, the pulleys 16, 18 and the belt 14 form a rotation transmitting mechanism and the electromagnetic clutch 10a and the pulley 10 form a clutch mechanism.

The ER-ECU 40 is an engine-stopped-mode auxiliary device driving means when executing the steps S300 to S330 of FIG. 3 and is an engine-stopped-mode vibration suppressing means when executing the steps S220 to S270 of FIG. 3. The ER-ECU 40 is an engine-starting-mode driving means when executing the steps S520 to S540 of FIG. 5 and is an automatic engine starting means when executing the steps S550 to S570 of FIG. 5 . The ER-ECU 40 is an engine-started-mode power generating means when executing the steps S650 and S660 of FIG. 6. The ER-ECU 40 is a deceleration-mode energy recovering means when executing the steps S720 and S730 of FIG. 7 and is a deceleration-mode engine stall preventing means when executing the steps S740 to S760 and S790 to S830 of FIG. 7.

The vehicle driving apparatus 100 of the illustrated embodiment has the following advantages.

(1) During the engine-stopped-mode M/G control procedure, the ER-ECU 40 disconnects the M/G 26 from the engine 2 when the engine 2 is stopped. The ER-ECU 40 thus enables the M/G 26 to drive the auxiliary device 22 while the engine 2 is maintained as stopped. This lowers fuel consumption.

(2) During the engine-stopped-mode M/G control procedure, the ER-ECU 40 connects the M/G 26 to the engine 2. In this state, the M/G 26 rotates the crankshaft 2a of the engine 2 in which the fuel injection is suspended. This suppresses vibration otherwise caused by stopping of the engine 2, thus improving driving comfort.

(3) During the engine-starting M/G control procedure, the ER-ECU 40 enables the M/G 26 to rotate the crankshaft 2a of the engine 2, thus generating force to move the vehicle. Thus, the vehicle is smoothly started when the condition for starting the engine 2 is satisfied. Further, the fuel injection is resumed in the engine 2 while the M/G 26 maintains the crankshaft 2a in the rotating state. The vehicle is thus smoothly started.

(4) During the deceleration-mode M/G control procedure, the ER-ECU 40 connects the M/G 26 to the engine 2 if the F/C procedure is being performed. The ER-ECU 40 thus enables the M/G 26 to generate power and recover the energy generated by the movement of the vehicle. This reduces fuel consumption. If the engine speed NE becomes lower than the engine-stall reference value NEL during the deceleration-mode M/G control procedure, the ER-ECU 40 connects the M/G 26 to the engine 2 such that the M/G 26 rotates the crankshaft 2a of the engine 2. This prevents an engine stall from occurring.

Particularly, if the fuel injection is suspended to allow the M/G 26 to recover an increased level of energy generated by the movement of the vehicle such that the engine speed NE becomes relatively low, resuming of the fuel injection may cause the engine stall. However, in the illustrated embodiment, the M/G 26 increases the speed the crankshaft 2a to prevent the engine stall from occurring.

(5) The ER-ECU 40 executes the engine-stopped-mode M/G control procedure, the engine-starting M/G control procedure, and the traveling-mode M/G control procedure to operate the M/G 26 efficiently, as shown in FIG. 8. The vehicle driving apparatus 100 thus improves driving comfort.

(6) One end of the crankshaft 2a of the engine 2 is connected to the wheels through the torque converter 4 with a lockup mechanism and the A/T 6. The pulley 10 is connected to the other end of the crankshaft 2a. That is, the power of the engine 2 is transmitted to the wheels through the converter 4 and the A/T 6 that are normal types. Accordingly, the present invention may be easily applied to a normal engine that does not include a major design change.

(7) The rotation of the M/G 26 is transmitted to the engine 2 in a decelerated state corresponding to a deceleration ratio between the pulleys 18, 10. For example, the rotation of the M/G 26 is transmitted to the engine 2 in accordance with the deceleration rate of 1/2.5. This increases rotation torque of the engine 2 when the M/G 26 rotates the crankshaft 2a. Accordingly, even if the M/G 26 is minimized, the M/G 26 rotates the crankshaft 2a stably such that the vehicle is started smoothly. The vehicle driving apparatus 100 thus may be minimized such that the vehicle becomes lighter. This reduces the power consumed by the rotation of the M/G 26.

(8) The single M/G 26 performs the various functions of FIG. 8. This saves the space in the vehicle driving apparatus 100. Further, the manufacturing cost of the vehicle driving apparatus 100 is reduced.

It should be apparent to those skilled in the art that the present invention may be embodied in many other specific forms without departing from the sprit or scope of the invention. Particularly, it should be understood that the invention may be embodied in the following forms.

The ER-ECU 40 may enable the M/G 26 to generate power in step S780 of the deceleration-mode M/G control procedure (FIG. 7).

In the illustrated embodiment, the rotation transmitting mechanism that connects the M/G 26 to the auxiliary device 22 includes the pulley and the belt. However, the rotation transmitting mechanism may include a sprocket combined with a chain or combined gears.

After the engine speed NE reaches the target idle speed NEid1 in the engine-stopped-mode M/G control procedure, the rotation speed of the M/G 26 may be gradually decreased before the M/G 26 is stopped or the electromagnetic clutch 10a is de-activated. In this case, the rotation speed of the crankshaft 2a of the engine 2 also gradually decreases. This prevents the creep power transmitted to the wheels through the torque converter 4 from dropping rapidly. Accordingly, vibration caused by the stopping of the engine 2 is further efficiently suppressed, thus improving the driving comfort. Also, the M/G 26 is stopped or the electromagnetic clutch 10a may be de-activated immediately before the engine speed NE reaches a resonance causing range. This suppresses vibration further efficiently.

The present examples and embodiments are to be considered as illustrative and not restrictive and the invention is not to be limited to the details given herein, but may be modified within the scope and equivalence of the appended claims.

What is claimed is:

1. A vehicle driving apparatus, which is installed in a vehicle that has an engine connected to a drive shaft, power from the engine being transferred by the drive shaft through a torque converter and an automatic transmission to an output shaft of the vehicle driving apparatus, the torque converter being connected to the drive shaft at an output end thereof, the automatic transmission being arranged at an output shaft side of the vehicle driving apparatus, wherein the apparatus automatically stops the engine if a predetermined condition for stopping the engine is satisfied and automatically starts the engine if a predetermined condition for starting the engine is satisfied, wherein the vehicle includes an auxiliary device that is connected to the drive shaft and is arranged at an outer periphery of the engine to a side of the drive shaft and on a side opposite to the output shaft side of the vehicle driving apparatus, and the apparatus comprises:

- a motor generator located at an outer periphery of the engine to a side of the drive shaft and on a side opposite to the output shaft side, wherein the motor generator is selectively connected to the engine separately from the drive shaft;
- a connecting mechanism, wherein the connecting mechanism connects the motor generator to the auxiliary device, and the connecting mechanism selectively connects the motor generator to the engine;
- an auxiliary device driving means, wherein the auxiliary device driving means enables the connecting mechanism to disconnect the motor generator from the engine and drives the auxiliary device through the motor generator in response to a request to drive the auxiliary device when the engine is maintained in an automatically stopped state;
- a vibration suppressing means, wherein the vibration suppressing means controls rotation of the drive shaft of the engine in the stopped state through the motor generator for suppressing vibration caused by stopping of the engine when the engine stopping condition is satisfied;
- a vehicle starting means, wherein the vehicle starting means controls the rotation of the drive shaft of the engine with the motor generator for generating force to move the vehicle when the engine starting condition is satisfied;
- an engine starting means, wherein the engine starting means starts the engine through the rotation of the drive shaft of the engine controlled by the vehicle starting means when the engine starting condition is satisfied;
- a traveling-mode power generating means, wherein the traveling-mode power generating means enables the motor generator to generate power through the rotation of the drive shaft of the engine when the vehicle is traveling.

2. The apparatus according to claim 1, further comprising:

- an energy recovering means, wherein the energy recovering means enables the connecting means to connect the motor generator to the engine and enables the motor generator to generate power through the rotation of the drive shaft of the engine for recovering energy generated by movement of the vehicle when fuel supply to the engine is suspended due to deceleration of the vehicle; and
- an engine stall preventing means, wherein the engine stall preventing means enables the connecting mechanism to connect the motor generator to the engine and enables the motor generator to increase the engine speed for preventing an engine stall from occurring if the engine speed becomes lower than a reference value after the fuel supply to the engine is resumed.

3. The apparatus according to claim 2, wherein the connecting mechanism includes:

- a rotation transmitting mechanism that connects the motor generator to the auxiliary device; and
- a clutch mechanism that selectively connects the rotation transmitting mechanism to the drive shaft of the engine.

4. The apparatus according to claim 3, wherein the rotation transmitting mechanism includes a pulley and a belt, and the clutch mechanism is located at the drive shaft of the engine and has a pulley that is connected to the belt of the rotation transmitting mechanism and a switching mechanism that selectively connects the pulley to the drive shaft of the engine.

5. The apparatus according to claim 3, wherein the rotation transmitting mechanism includes a sprocket and a chain, and the clutch mechanism is located at the drive shaft of the engine and includes:

- a sprocket that is connected to the chain of the rotation transmitting mechanism; and
- a switching mechanism that selectively connects the sprocket to the drive shaft of the engine.

6. The apparatus according to claim 3, wherein the rotation transmitting mechanism includes a plurality of gears, and the clutch mechanism includes:

- a clutch gear that is connected to the gears of the rotation transmitting mechanism; and
- a switching mechanism that selectively connects the clutch gear to the drive shaft of the engine.

7. The apparatus according to claim 3, further comprising:

- a torque converter, which is connected to the drive shaft of the engine; and
- wherein the transmission is an automatic transmission, and is connected to the torque converter.

8. The apparatus according to claim 7, wherein the torque converter is connected to a first end of the drive shaft of the engine, and the clutch mechanism is connected to a second end of the drive shaft, wherein the second end is opposite to the first end.

9. The apparatus according to claim 3, wherein the connecting mechanism reduces the rotation speed of the motor generator and rotates the drive shaft of the engine in accordance with the reduced rotation speed when the clutch mechanism connects the motor generator to the engine.

10. The apparatus according to claim 2, wherein the engine includes a throttle valve that adjusts the amount of air supplied to the engine, and the vibration suppressing means temporarily rotates the drive shaft of the engine, when the throttle valve is fully closed, at a speed equal to an idle speed through the rotation of the motor generator for reducing the pressure in each cylinder of the engine when the engine is stopped.

11. The apparatus according to claim 2, wherein the vehicle includes an accelerator pedal, and the engine starting means starts the engine after maintaining the engine speed at a predetermined value for a predetermined time if the accelerator pedal is not depressed.

12. The apparatus according to claim 1, wherein the connecting mechanism includes:

- a rotation transmitting mechanism that connects the motor generator to the auxiliary device; and
- a clutch mechanism that selectively connects the rotation transmitting mechanism to the drive shaft of the engine.

13. The apparatus according to claim 12, wherein the rotation transmitting mechanism includes a pulley and a belt, and the clutch mechanism is located at the drive shaft of the engine and has a pulley that is connected to the belt of the rotation transmitting mechanism and a switching mechanism that selectively connects the pulley to the drive shaft of the engine.

14. The apparatus according to claim 12, wherein the rotation transmitting mechanism includes a sprocket and a chain, and the clutch mechanism is located at the drive shaft of the engine and includes:
a sprocket that is connected to the chain of the rotation transmitting mechanism; and
a switching mechanism that selectively connects the sprocket to the drive shaft of the engine.

15. The apparatus according to claim 12, wherein the rotation transmitting mechanism includes a plurality of gears, and the clutch mechanism includes:
a clutch gear that is connected to the gears of the rotation transmitting mechanism; and
a switching mechanism that selectively connects the clutch gear to the drive shaft of the engine.

16. The apparatus according to claim 12, further comprising:
a torque converter, which is connected to the drive shaft of the engine; and
wherein the transmission is an automatic transmission, and is connected to the torque converter.

17. The apparatus according to claim 16, wherein the torque converter is connected to a first end of the drive shaft of the engine, and the clutch mechanism is connected to a second end of the drive shaft, wherein the second end is opposite to the first end.

18. The apparatus according to claim 12, wherein the connecting mechanism reduces the rotation speed of the motor generator and rotates the drive shaft of the engine in accordance with the reduced rotation speed when the clutch mechanism connects the motor generator to the engine.

19. The apparatus according to claim 1, wherein the engine includes a throttle valve that adjusts the amount of air supplied to the engine, and the vibration suppressing means temporarily rotates the drive shaft of the engine, when the throttle valve is fully closed, at a speed equal to an idle speed through the rotation of the motor generator for reducing the pressure in each cylinder of the engine when the engine is stopped.

20. The apparatus according to claim 1, wherein the vehicle includes an accelerator pedal, and the engine starting means starts the engine after maintaining the engine speed at a predetermined value for a predetermined time if the accelerator pedal is not depressed.

21. A method for controlling a vehicle driving apparatus that includes a motor generator, an auxiliary device, and a connecting mechanism that connects the motor generator to the auxiliary device and selectively connects the motor generator to an engine separately from a drive shaft, power from the engine being transferred by the drive shaft through a torque converter and an automatic transmission to an output shaft of the vehicle driving apparatus, the torque converter being connected to the drive shaft at an output end thereof, the automatic transmission being arranged at an output shaft side of the vehicle driving apparatus, the motor generator and the auxiliary device being arranged at an outer periphery of the engine to a side of the drive shaft and on a side opposite to the output shaft side of the vehicle driving apparatus, and the auxiliary device being connected to the drive shaft, the method comprising:
automatically stopping the engine when a predetermined condition for stopping the engine is satisfied;
automatically starting the engine when a predetermined condition for starting the engine is satisfied;
enabling the connecting mechanism to disconnect the motor generator from the engine and driving the auxiliary device through the motor generator in response to a request to drive the auxiliary device when the engine is maintained in an automatically stopped state;
suppressing vibration caused by stopping of the engine by enabling the connecting mechanism to connect the motor generator to the engine and controlling shaft rotation of the engine in the stopped state through the motor generator when the engine stopping condition is satisfied;
enabling the connecting mechanism to connect the motor generator to the engine and controlling the shaft rotation of the engine through the motor generator for generating force to move a vehicle when the engine starting condition is satisfied;
starting the engine through the shaft rotation of the engine when the engine starting condition is satisfied; and
enabling the connecting mechanism to connect the motor generator to the engine and enabling the motor generator to generate power through the engine when the vehicle is traveling.

22. The method according to claim 21, further comprising:
enabling the connecting mechanism to connect the motor generator to the engine and enabling the motor generator to generate power through shaft rotation of the engine for recovering energy generated by movement of the vehicle when a fuel supply to the engine is suspended due to deceleration of the vehicle; and
enabling the connecting mechanism to connect the motor generator to the engine and increasing the engine speed through the motor generator for preventing an engine stall if the engine speed becomes lower than a reference value after the fuel supply is resumed.

23. A vehicle driving apparatus, which is installed in a vehicle that has an engine connected to a drive shaft, power from the engine being transferred by the drive shaft through a torque converter and an automatic transmission to an output shaft of the vehicle driving apparatus, the torque converter being connected to the drive shaft at an output end thereof, the automatic transmission being arranged at an output shaft side of the vehicle driving apparatus, wherein the apparatus automatically stops the engine if a predetermined condition for stopping the engine is satisfied and automatically starts the engine if a predetermined condition for starting the engine is satisfied, wherein the vehicle includes an auxiliary device that is connected to the drive shaft and is arranged at an outer periphery of the engine to a side of the drive shaft and on a side opposite to the output shaft side of the vehicle driving apparatus, and the apparatus comprises:
a motor generator located at an outer periphery of the engine to a side of the drive shaft and on a side opposite to the output shaft side, wherein the motor generator is selectively connected to the engine separately from the drive shaft;
a connecting mechanism, wherein the connecting mechanism connects the motor generator to the auxiliary device and selectively connects the motor generator to the engine;
an auxiliary device driving means, wherein the auxiliary device driving means enables the connecting mechanism to disconnect the motor generator from the engine and drives the auxiliary device through the motor generator in response to a request to drive the auxiliary device when the engine is maintained in an automatically stopped state;

a vibration suppressing means, wherein the vibration suppressing means controls rotation of the drive shaft of the engine in the stopped state through the motor generator for suppressing vibration caused by stopping of the engine when the engine stopping condition is satisfied;

a vehicle starting means, wherein the vehicle starting means controls the rotation of the drive shaft of the engine through the motor generator for generating force to move the vehicle when the engine starting condition is satisfied;

an engine starting means, wherein the engine starting means starts the engine through the rotation of the drive shaft of the engine controlled by the vehicle starting means when the engine starting condition is satisfied.

24. The apparatus according to claim 23, further comprising:

an engine stall preventing means, wherein the engine stall preventing means enables the connecting mechanism to connect the motor generator to the engine and enables the motor generator to increase the engine speed for preventing an engine stall from occurring if the engine speed becomes lower than a reference value after the fuel supply to the engine is resumed.

25. A vehicle driving apparatus, which is installed in a vehicle that has an engine connected to a drive shaft, power from the engine being transferred by the drive shaft through a torque converter and an automatic transmission to an output shaft of the vehicle driving apparatus, the torque converter being connected to the drive shaft at an output end thereof, the automatic transmission being arranged at an output shaft side of the vehicle driving apparatus, wherein the apparatus automatically stops the engine if a predetermined condition for stopping the engine is satisfied and automatically starts the engine if a predetermined condition for starting the engine is satisfied, wherein the vehicle includes an auxiliary device that is connected to the drive shaft and is arranged at an outer periphery of the engine to a side of the drive shaft and on a side opposite to the output shaft side of the vehicle driving apparatus, and the apparatus comprises:

a motor generator located at an outer periphery of the engine to a side of the drive shaft and on a side opposite to the output shaft side, wherein the motor generator is selectively connected to the engine separately from the drive shaft;

a connecting mechanism, wherein the connecting mechanism connects the motor generator to the auxiliary device and selectively connects the motor generator to the engine;

an auxiliary device driving means, wherein the auxiliary device driving means enables the connecting mechanism to disconnect the motor generator from the engine and drives the auxiliary device through the motor generator in response to a request to drive the auxiliary device when the engine is maintained in an automatically stopped state; and a control circuit, wherein the control circuit controls rotation of the drive shaft of the engine in the stopped state through the motor generator for suppressing vibration caused by stopping of the engine when the engine stopping condition is satisfied, controls the rotation of the drive shaft of the engine through the motor generator for generating force to move the vehicle when the engine starting condition is satisfied, and starts the engine through the rotation of the drive shaft of the engine when the engine starting condition is satisfied.

26. The apparatus according to claim 25, wherein the control circuit enables the connecting mechanism to connect the motor generator to the engine and enables the motor generator to increase the engine speed for preventing an engine stall from occurring if the engine speed becomes lower than a reference value after the fuel supply to the engine is resumed.

* * * * *